Dec. 30, 1930.  G. WILCOX  1,786,724
PEACH PITTER
Filed June 12, 1924  13 Sheets-Sheet 3

INVENTOR
GEORGE WILCOX
BY,
ATTORNEYS.

Dec. 30, 1930.  G. WILCOX  1,786,724
PEACH PITTER
Filed June 12, 1924  13 Sheets-Sheet 5

INVENTOR
GEORGE WILCOX
BY,

ATTORNEYS,

Dec. 30, 1930.  G. WILCOX  1,786,724
PEACH PITTER
Filed June 12, 1924   13 Sheets-Sheet 6

INVENTOR
GEORGE WILCOX
BY
ATTORNEYS.

Dec. 30, 1930.  G. WILCOX  1,786,724
PEACH PITTER
Filed June 12, 1924   13 Sheets-Sheet 7
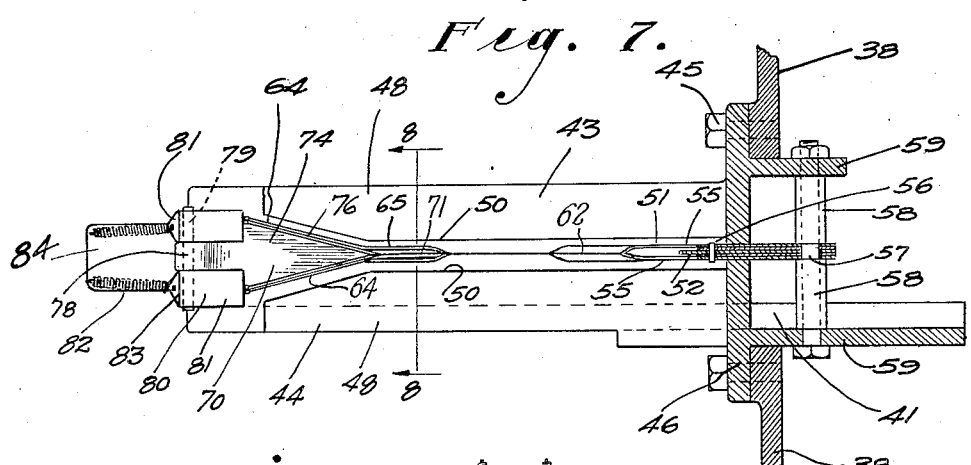
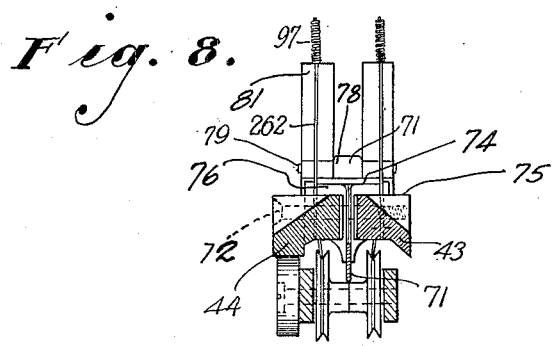
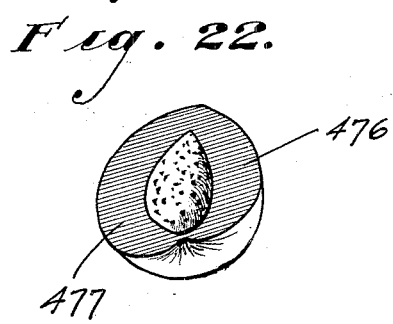
INVENTOR
GEORGE WILCOX
BY
ATTORNEYS,

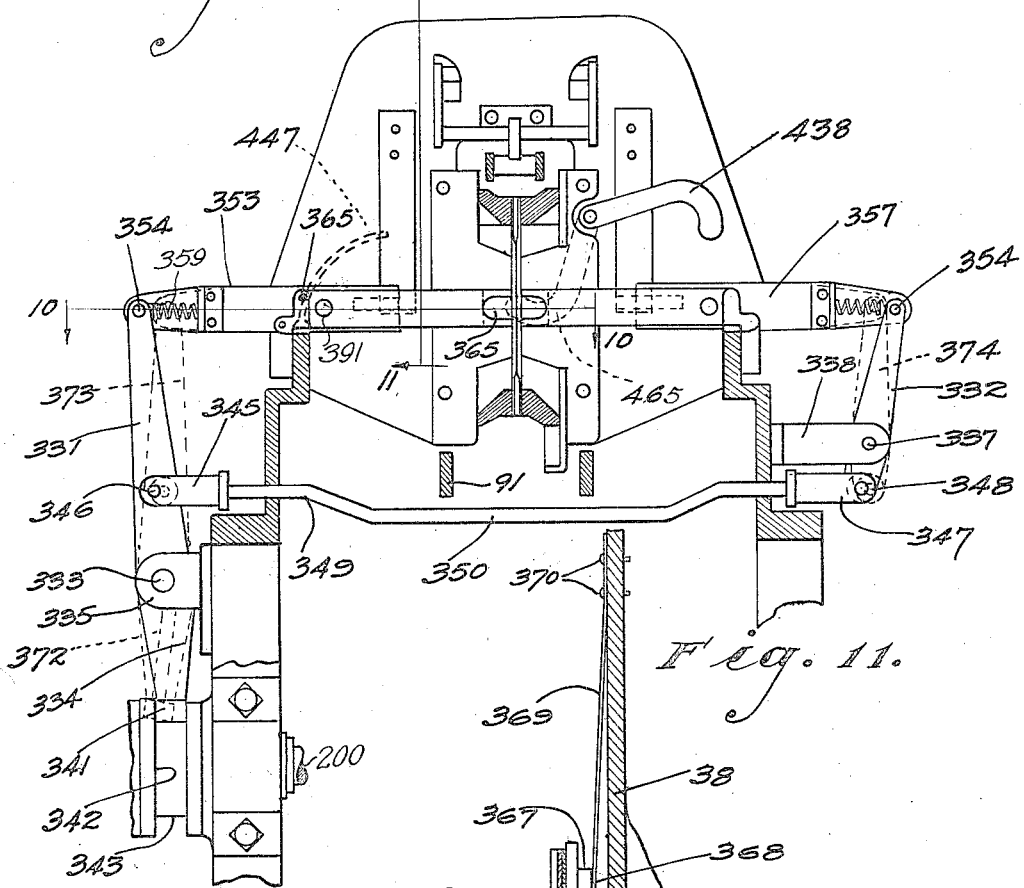

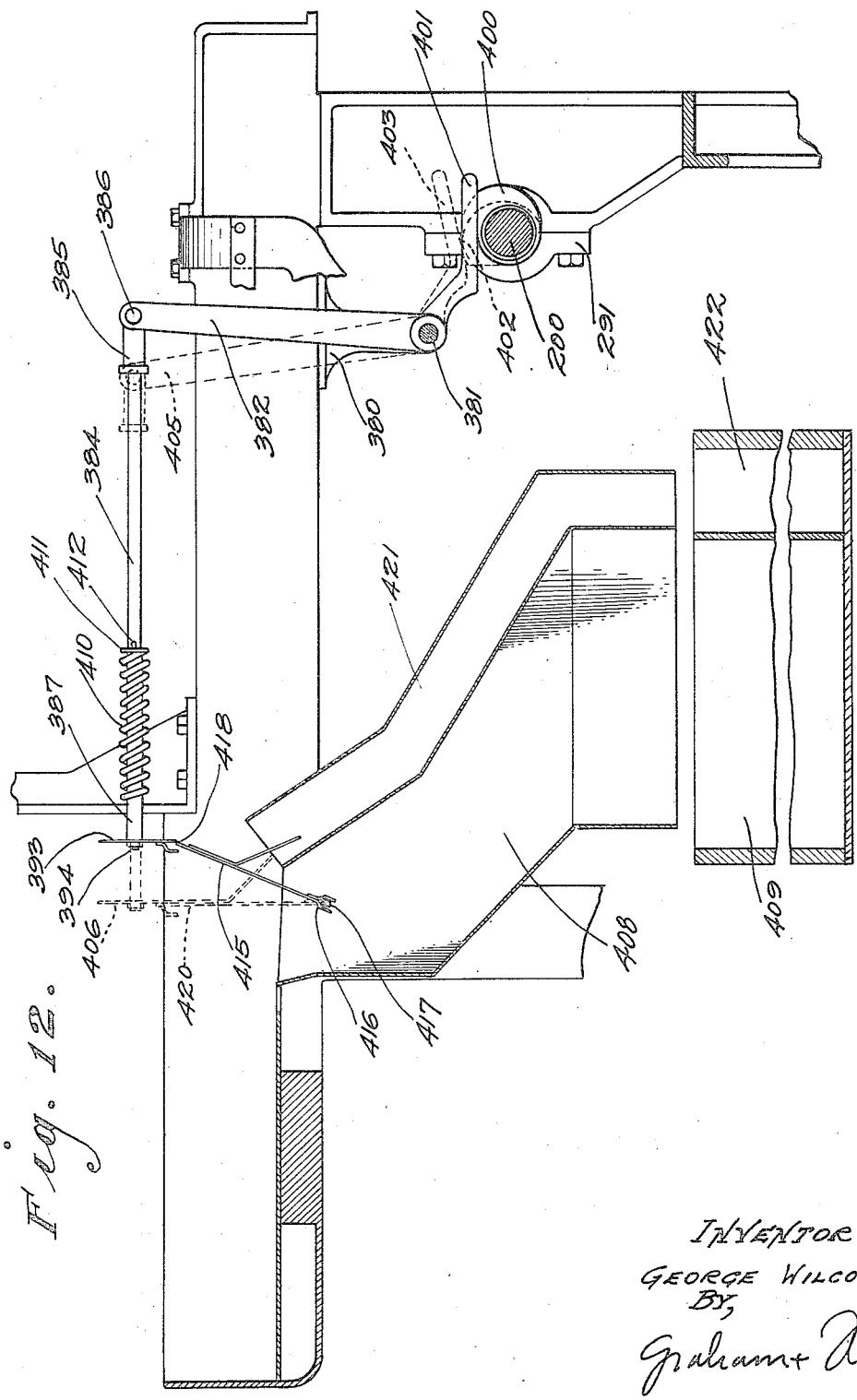

Dec. 30, 1930.　　　　　G. WILCOX　　　　　1,786,724
PEACH PITTER
Filed June 12, 1924　　　13 Sheets-Sheet 10
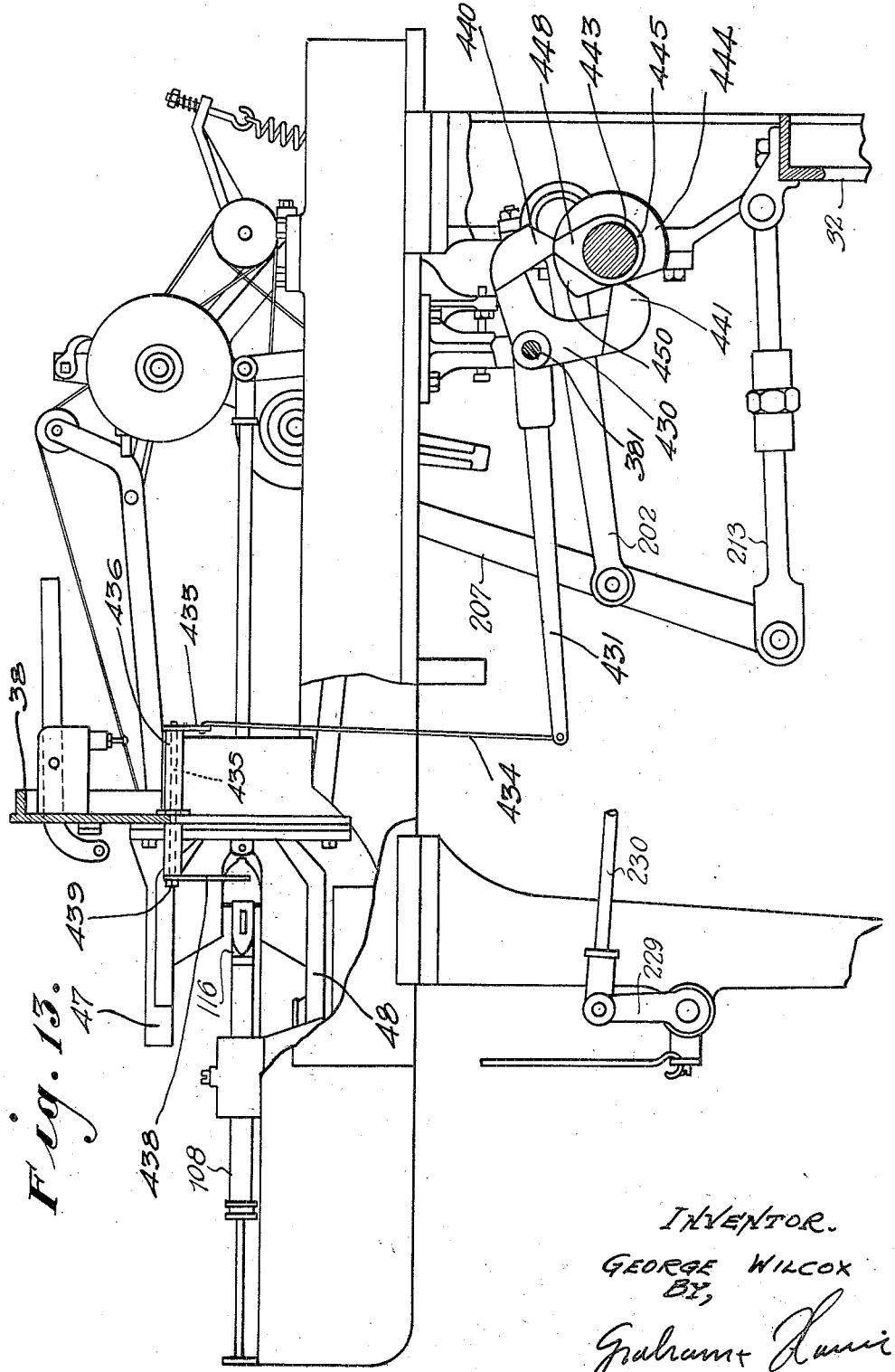
INVENTOR.
GEORGE WILCOX
BY,
Graham + Harris
ATTORNEYS.

Dec. 30, 1930.  G. WILCOX  1,786,724
PEACH PITTER
Filed June 12, 1924   13 Sheets-Sheet 11
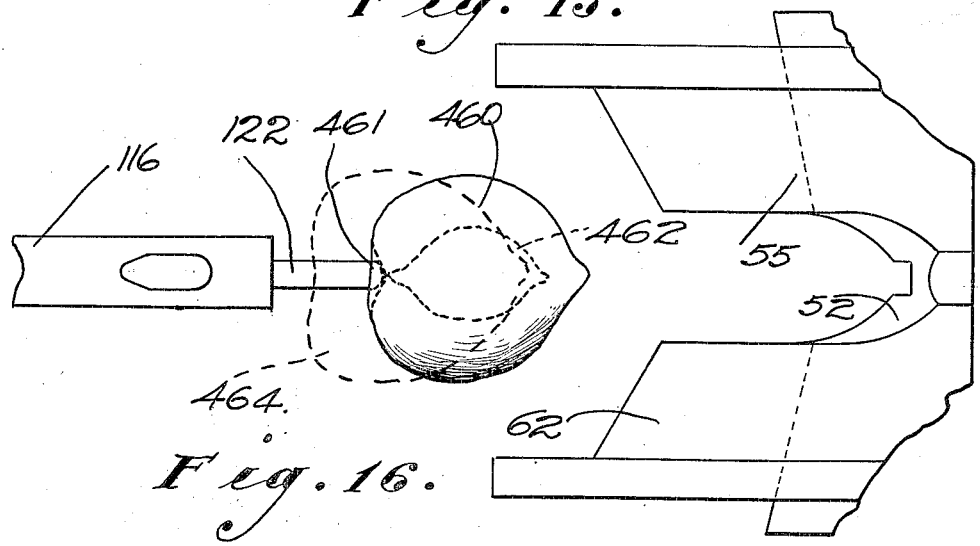
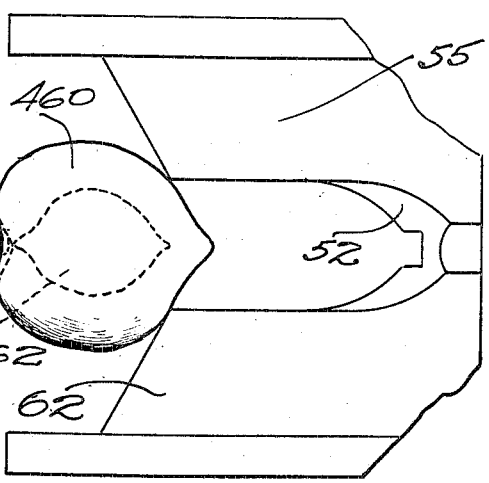
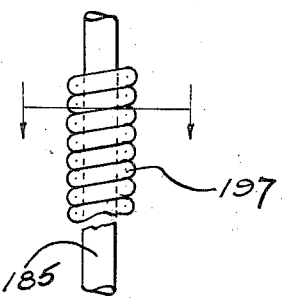
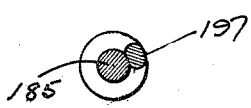
INVENTOR
GEORGE. WILCOX
BY,
ATTORNEYS

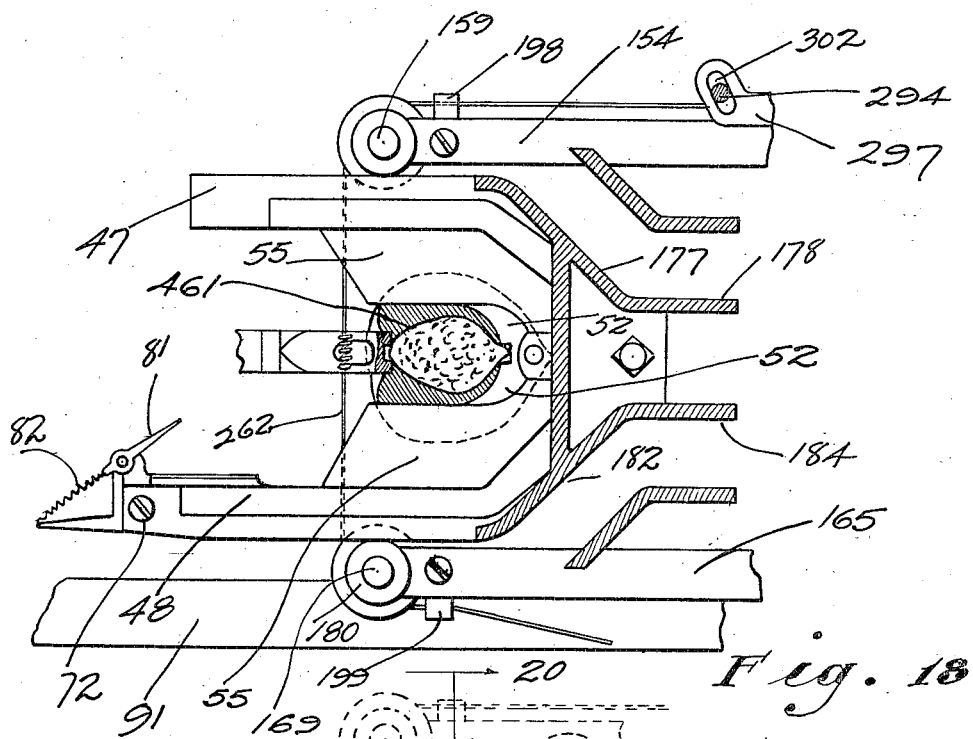
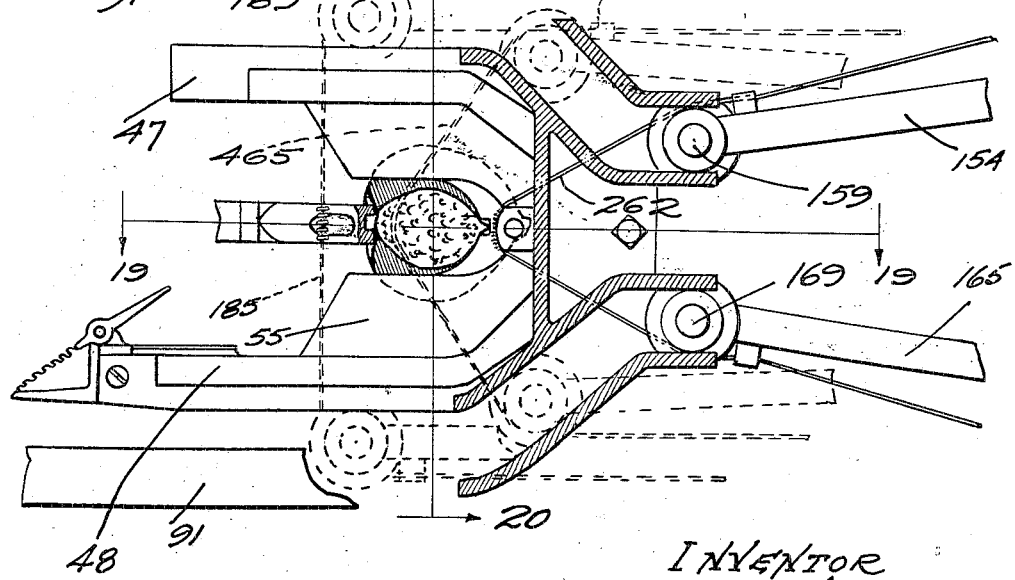

Dec. 30, 1930.    G. WILCOX    1,786,724
PEACH PITTER
Filed June 12, 1924    13 Sheets-Sheet 13
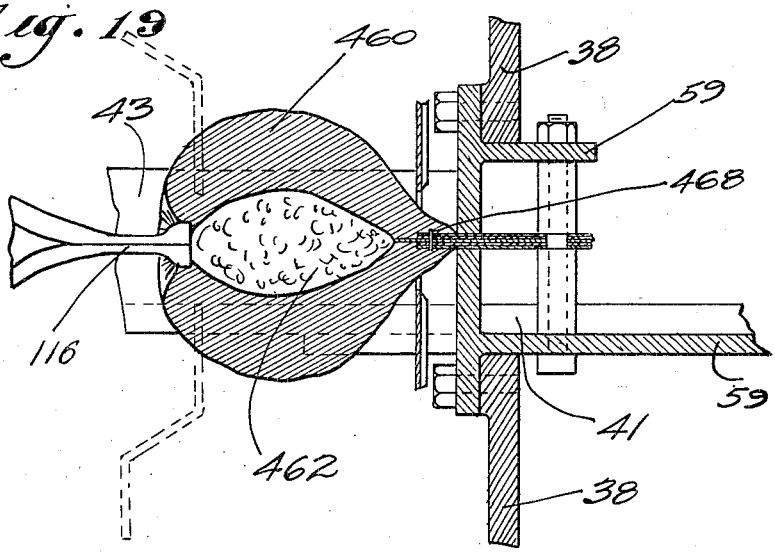
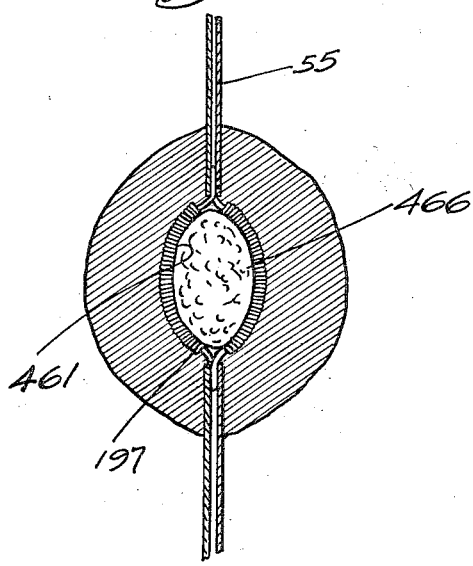
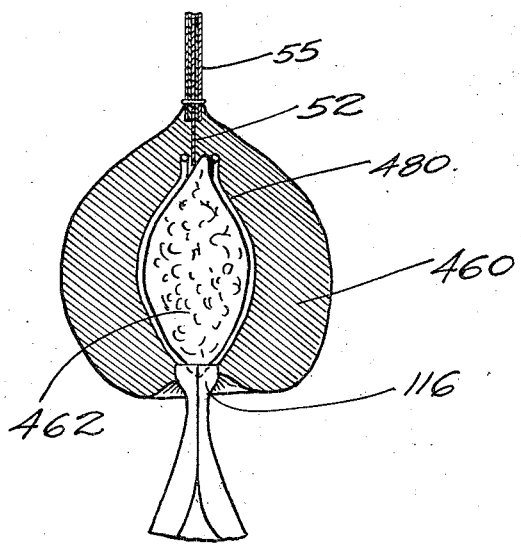
INVENTOR
GEORGE WILCOX
BY
Graham + Harris
ATTORNEYS.

Patented Dec. 30, 1930

1,786,724

UNITED STATES PATENT OFFICE

GEORGE WILCOX, OF RIVERSIDE, CALIFORNIA, ASSIGNOR TO CALIFORNIA CANNING MACHINERY CO., OF LOS ANGELES, CALIFORNIA

PEACH PITTER

Application filed June 12, 1924. Serial No. 719,502.

This invention relates to machines for halving and removing the pits from drupaceous fruits, and it comprises improvements upon an invention presented in my previous application entitled Method and machine for prepared fruit for canning, Serial No. 612,510, filed January 13, 1923, which has been allowed and issued on March 25, 1924, as Patent No. 1,488,082.

In the following description, I shall describe my invention as being constructed for the purpose of halving and pitting clingstone peaches, which are one variety of fruit. It shall be understood, however, that, with or without slight modification, my invention may be utilized to halve and pit any of several similar fruits.

In the fruit canning industry, fruits such as clingstone peaches are usually halved and the pits removed therefrom before they are subjected to certain baths, which remove the skin from the fruit. Until the time of my previous invention above referred to, the halving thereof and the removing of the pits from the peaches were done by hand. A curved knife was used for this purpose, said knife being inserted into each peach or similar fruit and so manipulated as to cup completely around the pit thereof. It will readily be recognized that the quality of the work depended directly upon the skill and care exercised by the operator, and that it was impossible to obtain a uniform quality of workmanship. Further, it was impossible to very closely follow the contour of the pit with the knife. There was accordingly considerable waste in the manual removing of the pits, only about twelve per cent of the peaches pitted manually having ordinarily been in the "fancy" or "A—1" class.

The principal object of my invention is to provide a pitting machine, which will simultaneously halve and pit drupaceous fruits in such manner that practically all will be cut into fairly exact halves of uniform grade, and which will so separate the meat from the pit as to waste substantially no meat. The halving of the fruits is accomplished by the employment of an incisor member on which the fruit is impaled, as by means hereinafter referred to as a pit center, in such manner to hold the pit securely on the incisor. A pair of flexible severing members are then passed centrally through the peach in such a manner that one of said members passes to each side of the pit. Means are also provided for causing the flexible severing members to adhere closely to the contour of the pit.

It is also an important object of my invention to provide a means, which may be disposed on the flexible severing members, for preventing the severing members from becoming caught on the pit of the fruit, as it is halved. In most of the drupaceous fruits, the pits are of an oblong shape and the surface is such that it may present a multiplicity of pointed projections which tend to interfere with the passing of the flexible severing members through the fruit. By providing on the severing means, a pit engaging member, which tends to roll over the sharp projections of the pit, the danger of a catching of the severers is punctually eliminated.

It is a further object of my invention to provide an arrangement whereby the severing members may be maintained at a predetermined tension, so that breakage of severing members due to excessive tension will not occur. For this purpose, I provide a relieving means so constructed that when the tension in a severing wire exceeds a certain point, the tension thereof will be automatically limited.

It is a still further object of my present invention to provide means for removing the "tips" of the fruit. Practically all the fruits of the drupaceous family have what is termed a tip, which may be described as a projection of the meat of the fruit, located practically opposite the stem end thereof. In preparing a fruit for canning, this tip is preferably removed.

It is also an object of my present invention to provide a means for removing the meat of the fruit from the incisor after it has been severed, while the pit is still in place.

It is another object of the invention to provide a means for ejecting the pit.

It is a further object of this invention to separate the meat and the pit of the fruit, directing them to different receptacles.

It is a still further object of the invention to incorporate a means for continually changing the active portions of the severing members so that the possibility of their breaking due to wear at one point is considerably reduced.

Further objects of the invention and the especial advantages will be made evident hereinafter; but I may mention at this point that it is one object of my invention to provide, in a device of this character, a particular type of incisor element which will allow the severers to completely compass the pit of the fruit, even through the pit may not be held centrally with respect to the incisor element. My novel incisor element may include a central blade or saddle against which the pit is arranged to contact; and the arrangement referred to is preferably such that the saddle retains the rearward end of the pit a short distance forward of the rearward portions of the incisor blades of the element. In the event that the pit is skewed to one side, so as not to be centrally disposed, the rearward end of the pit may extend to one side of the saddle and still leave room for the severers to pass therearound.

In the accompanying drawings, there is shown a pitting machine, which is designed especially for the halving and pitting of clingstone peaches. The drawings, which are for illustrative purposes only, are of a somewhat diagrammatic character, and in some of the views, parts have been purposely left out, in order more clearly to exhibit the essential features.

Fig. 7 is a section taken as indicated by the line 7—7 of Fig. 6, and showing the manner in which the incisor blades are secured to the blade frames.

Fig. 8 is a section taken as indicated by the line 8—8 of Fig. 7.

Fig. 9 is a fragmentary view taken on the line 9—9 of Fig. 2, and showing the arrangement and indicating the operation of the tip removing mechanism.

Fig. 10 is a section taken on the line 10—10 of Fig. 9.

Fig. 11 is a section taken on the line 11—11 of Fig. 9.

Fig. 12 is a longitudinal section through the device showing very clearly the fruit removing mechanism, the channel separator and the respective channels through which the meats and pits pass to reach the receiving receptacles.

Fig. 13 is a sectional view showing pit-ejecting mechanism and indicating the operation thereof.

Fig. 14 is a greatly enlarged fragmentary view showing the pit engaging member.

Figs. 15, 16, 17, 18, 19 and 20 are fragmentary views showing the different operations involved in the halving and pitting of the fruit.

Fig. 21 is a fragmentary view, showing the manner in which the severing wires may pass the pit in the event that the pit is not centrally supported.

Fig. 22 is a perspective view of a half of a fruit, which has been prepared in my machine.

Figure 1:
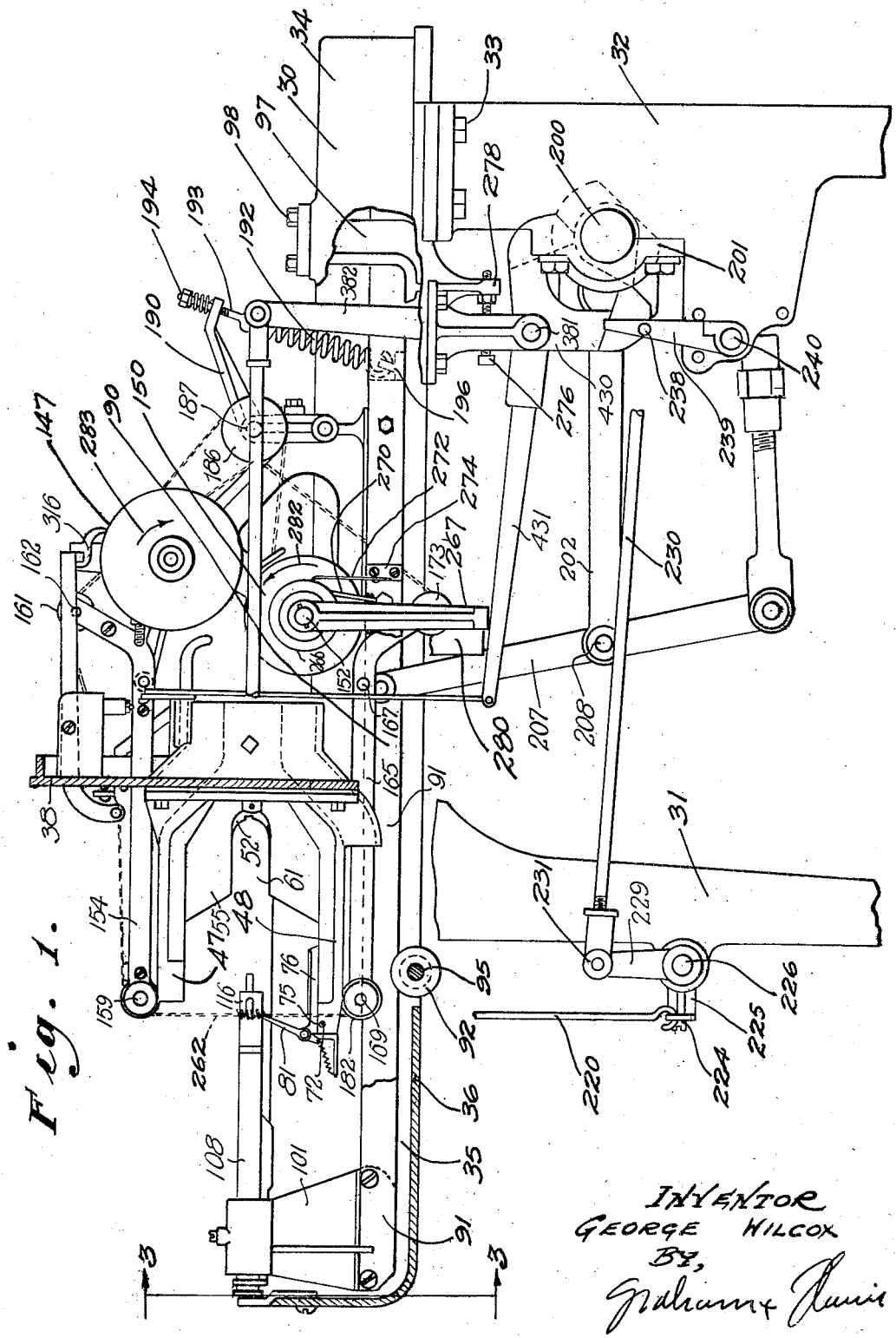
Fig. 1 is a side elevational view of the pitting machine partially sectioned in a manner favorable to a showing of the main features of the invention. The pitter, in this view, is shown in its inoperative or starting position.
Figure 2:
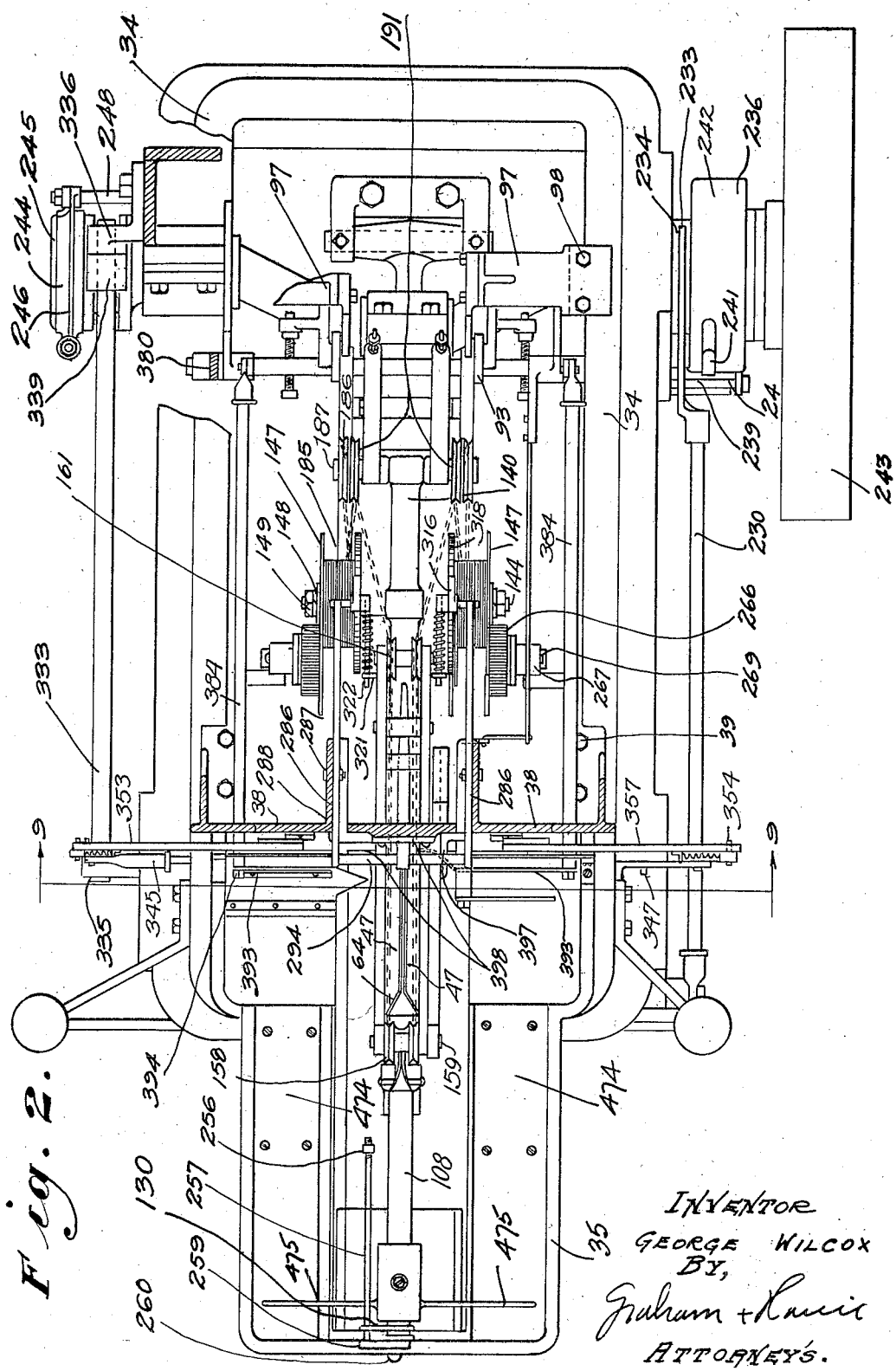
Fig. 2 is a plan view corresponding to Fig. 1.
Figure 3:
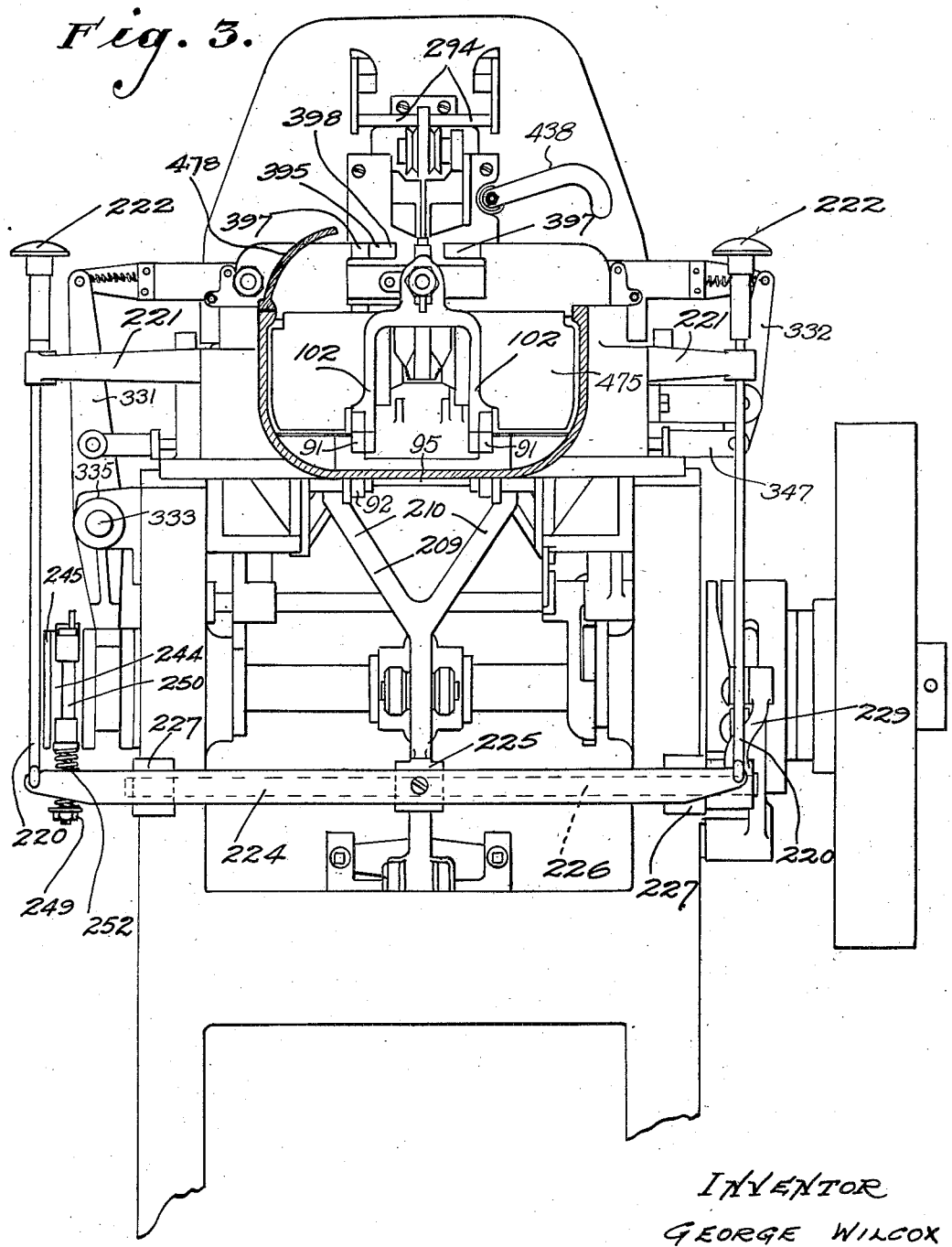
Fig. 3 is a section taken as indicated by the line 3—3 of Fig. 1.

As shown best in Figs. 1, 2 and 3 of the drawings, the body or supporting structure of my machine, may comprise a bed 30, supported on the front and rear legs 31 and 32 respectively; and any suitable means such as bolts or cap screws 33 may be used to rigidly secure the legs and bed together. The bed 30 is shown as comprising a perimetric wall 34, and it may have its width at the forward part 35 reduced, as shown, and provided with a bottom 36. An incisor head 38 may be attached to the bed 30 by suitable bolts 39; and, as clearly shown in Figs. 6 and 7, said head may have a central vertically extending opening 41 therein. A pair of incisor frames 43 and 44 are shown (see Fig. 7) as secured to the incisor head 38 by the cap screws 45, which extend through the flanges 46.

Each of the frames 43 and 44 has upper and lower arms 47 and 48, which arms extend forwardly from the flange 46. Between the adjacent faces 50 of the arms 47 and 48, an incisor element 51 is rigidly secured. The incisor element consists, in the embodiment shown, of a central blade 52, spacer members 53 which are placed to each side of the central blade 52, and a pair of lateral incising blades 55, which are placed one on each side of the spacer members 53. The blades 52 and 55 and the spacers 53 (see Figs. 7, 14, 15) are shown as secured together by the rivet 56, and by the bolt 57, which is provided with sleeves 58 and which extends through the rearwardly extending walls 59 of the incisor frames 43 and 44.

Figure 6:
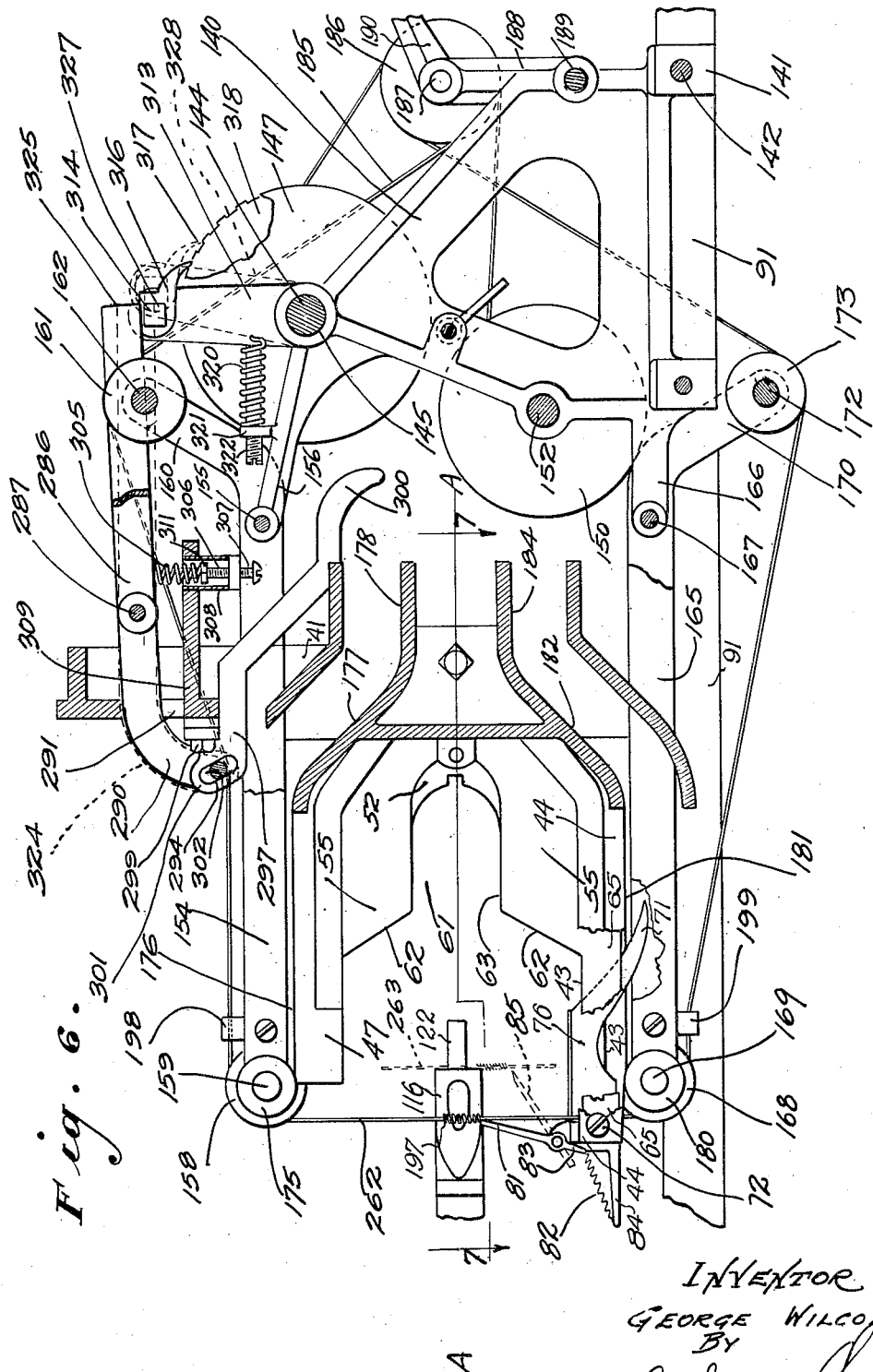
Fig. 6 is an enlarged fragmentary section showing the foot structure of the carriage and also the parts and operation of the tension regulating mechanism.

As shown in Fig. 6, the central blade 52 is considerably shorter than the incising blades 55. The incising blades 55 are forwardly recessed as indicated at 61 in a manner to expose the central portion of the blade 52; and the edges 62 and 63 are sharpened and bent inwardly so that the former, at least, of said edges meet as is shown in Fig. 7. The substantially vertical faces 50 of the frames 43 and 44 are continuous with divergent and substantially vertical faces at the forward ends of the arms 47 and 48 as shown at 64 in Figs. 2 and 7; and strips 65 are preferably so formed as substantially to follow the contour of the faces 50. A severer spreader 70 may be secured between the lower arms 48 of the incisor frames 43 and 44, as clearly shown in Figs. 7 and 8, and this spreader 70 may comprise a central portion 71, which is projected between the arms 48, and through which a screw 72 extends to secure the spreader in place. Extending rearwardly from the central portion 71 of the spreader 70 is shown a spreader wedge 74, which may upwardly terminate in a plane slightly above the top face 75 of the arms 48 (as best shown in Fig. 8), the sides 76 of the wedge 74 extending in planes substantially parallel with the planes of the inwardly convergent portions 64 of the faces 50.

At each side of a lug 78, formed on the upper face of the central portion 71, and pivoted on a pin 79 are pit-engaging member adjusters 80, (see Fig. 6) which comprise fingers 81. The adjusters 80 are provided with resilient means such as coil springs 82, which extend between ears 83 of the adjusters and the forward end of a projection 84. In this embodiment of my invention, when the adjusters 80 are disengaged, they are yieldingly retained in the position indicated by the dotted lines 85 of Fig. 6.

A carriage structure 90 comprised in this machine may include a pair of track bars 91, (see Figs. 1, 2 and 4) which are shown as extending horizontally and which may be arranged to ride on supports such as forward rollers 92 and rearward rollers 93, the forward rollers 92 being rotatable on a shaft 95 secured substantially in the plane of the bottom 36 of bed 30 and the rearward rollers 93 being rotatable on shafts 96, which are shown as carried by brackets 97, secured to the perimetric wall 34 by cap screws 98. A head structure is located at the forward ends of the bars 91, and, as shown in Figs. 1, 3 and 5, this head structure may include a pitting center head 101 having a pair of vertical legs 102, adapted to extend between the bars 91, being shown as attached thereto by the screws 103. A horizontal bore 105 is shown as provided in a portion 106 of the pitting center head 101, a pitting center bar 108 being slidable therein. The bar 108 may be frictionally retained in the bore 105 by means such as a plug member 110, which may be caused by a spring 111, to engage the bar 108, the pressure exerted by this spring being regulatable by a screw 112, all of the last mentioned parts being situated in the hole 114. A pitting center 116 may be attached to the rearward end of the pitting center bar 108 by a threaded plug 117, which is shown as entering a threaded bore 118. The pitting center bar 108 may have a central opening 119 and the pitting center 116 may have a central opening 120, these openings being in axial alignment, and a pit finder in the form of a cylindrical rod 122 being situated in the openings 119 and 120. A forward portion of the pit finder 122 is shown as flattened at 123; and a collar 124 may be pinned thereon as shown, this collar 124 carrying a lip 126 cooperating with the flattened portion 123 to provide a notch 127. A pit finder latch 129 may be pivoted to a lug 130 secured to the bar 108, and it may extend rearwardly through a slot 131.

The rearward end of the latch 129 may have a finger 133 adapted to engage in the notch 127 and to prevent the finder 122 from being unduly extended rearwardly in the bar 108 and center 116 by the coil spring 134. To release the pit finder 122, so that it may be projected rearwardly by the spring, it is necessary first to force it forwardly so that the finger and notch disengage. The latch 129 will then be removed from the path of the notch 127 by the leaf spring 136, the latch assuming the position indicated by the dotted lines 137.

The foot structure of the carriage 90 is shown best in Figs. 1, 2 and 6. In these figures is shown a foot frame 140, which provides blocks 141, arranged to extend between the bars 91. Bolting means 142 are supplied for securing the frame 140 to the bars. At the apex of the foot frame 140 is a shaft 144, which extends through the bore 145 and which extends outwardly from the foot frame 140 at both sides. Magazine reels or spools 147 are rotatably, but frictionally secured on extending ends of the shaft 144, as by means of suitable lock washers 148 and nuts 149. Below the magazines 147, take-up reels 150 are rotatably placed on an extending shaft 152, which is shown as secured in the frame 140. A pair of upper tucker arms 154 are shown as pivotally secured to the foot frame 140 by a pin 155, which extends through the arm 156 of the frame. The tucker arms 154 extend forwardly through the central opening 41 in the incisor head 38. These arms are shown as arranged to extend in a plane slightly above the arms 47 of the incisor frames and they have at their extreme forward ends a pair of sheaves 158, which are shown as rotatable on a pin 159. The rearward ends of the arms 154 may be directed upwardly, as at 160, and may carry a pair of sheaves 161, mounted on a pin 162, which is shown as secured to the extreme rearward ends of the tucker arms 154. Lower tucker arms 165 may be pivoted to the arm 166 of the frame 140, as by a pin 167; and they may extend forwardly through the opening 41 in the head 38 and may carry sheaves 168 pivoted on a pin 169 extending therethrough, the lower arms preferably extending slightly below the arms 48 of the incisor frames. The rearward ends of the lower tucker arms 165 may be directed downwardly, as at 170, and may carry a pin 172 extended therethrough, on which additional sheaves 173 are rotatable. On the pin 159 of the upper tucker arms 154, a roller 175 may be rotatably disposed at one side of the arms 154, this roller 175 being arranged to travel on a track such as is shown at 176, this track being preferably formed on the arm 47 of the incisor frame 44. The mentioned track is shown as directed downwardly at 177 and then horizontally at 178. On the pin 169, a roller 180 may be rotatably disposed at the side of the lower tucker arms 165 as shown, this roller being arranged to travel on a track 181 provided by the arm 48 of the incisor frame 44, the track 181 being directed upwardly at 182 and horizontally again at 184. In the construction shown, the upper tucker arms 154 and the upper track 176, and the lower tucker arms 165 and the lower track 181 are substantially symmetric as regards the center line A—A, this line A—A passing through the center of the head structure of the carriage and the center of the incisor frames and blades.

The magazines 147 are arranged to carry a supply of flexible wire 185, which is wound thereon as shown, this wire 185 serving as a flexible severing means. From the magazine reels 147, the wire may pass over yielding sheaves 186, shown as rotatable on shafts 187, shown as secured to brackets 188 pivoted to the frame 140 at 189. The arms 190 of the brackets 188 may extend rearwardly, as shown in Fig. 1 and may be associated with tension springs 192 through members 193, adjustable by means such as nuts 194. The springs are shown as secured by the bracket 196 to the rear end of the carriage bars 91. From the yielding sheaves, the wires 185 may pass over the sheaves 161, and thence to the forward sheaves 158. The wires 185 may then pass downwardly to the sides of the pitting center 116, around the wire spreader 70, between the arms 48, and over the lower forward sheaves 168. After passing over the sheaves 173, the wires may pass around yielding sheaves 191 and then to the take-up reels 150. Blocks 198 and 199 through which the wires 185 pass, are provided between the upper tucker arms 154 and the lower tucker arms 165, to guide the wires 185 upon the sheaves 158 and 168 respectively. A wire-carried pit-engaging member 197 is shown (see Figs. 1, 6 and 20) as placed on each of the wires 185 and held in place by the fingers 81 of the adjusters 80. In Fig. 14, the pit-engager is shown as being a coiled wire which is rotatable on the wires 185. This construction of the pit-engager 197 may be more advantageous than using metal beads strung on the wires 185.

Figure 4:
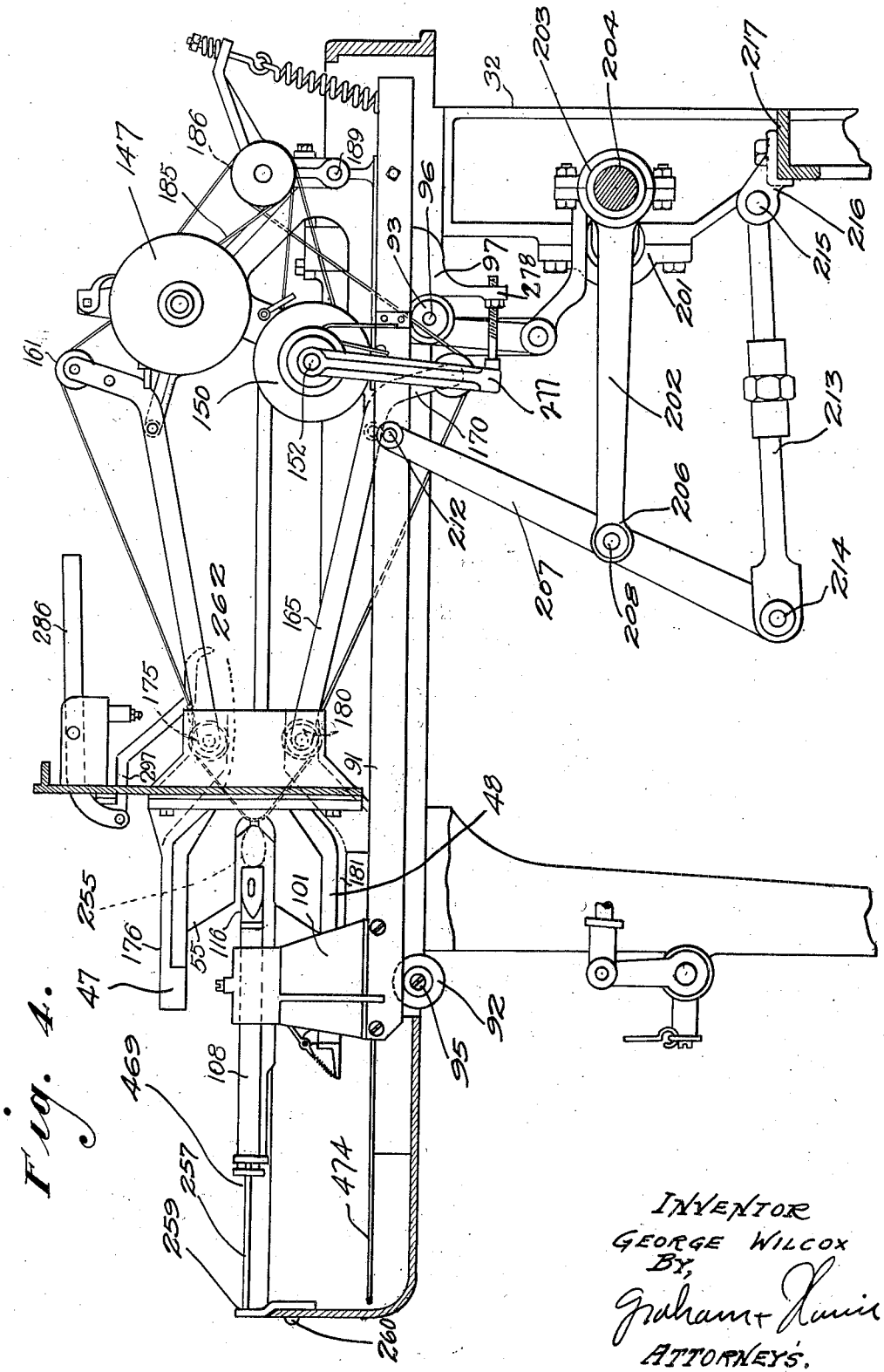
Fig. 4 is a side view of the machine, partially sectioned, and showing the location of the parts at the end of the rearward travel of the carriage.
Figure 5:
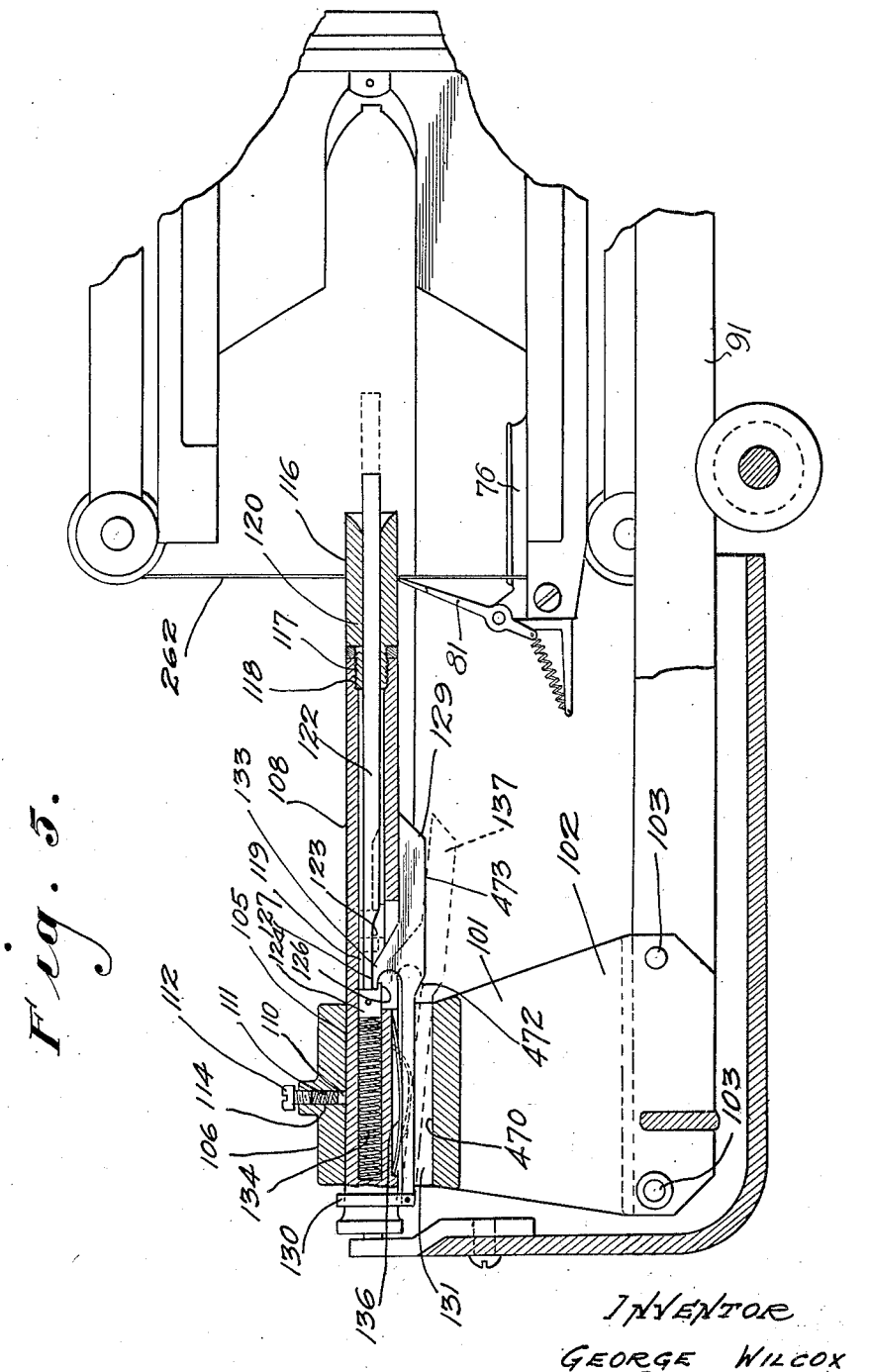
Fig. 5 is an enlarged fragmentary section of the head structure of the carriage.

To reciprocate the described carriage, I may employ mechanism such as is shown best in Figs. 1, 3 and 4. This mechanism comprises a crank shaft 200, which journals in the bearings 201 provided on the rear legs 32. A connecting rod 202 is shown as having a bearing 203, for the crank portion 204 of the crank shaft 200 and the forward end of the connecting rod 202 may be clevised, as at 206, and secured to a rocker arm 207, as by a pin 208. The upper part of the rocker arm 207 is shown bifurcated at 209 and each of the arms 210 may be pivotally attached as by pins 212, to the carriage bars 91. The lower end of the rocker arm 207 may be pivoted to an adjustable link 213, as by the pin 214, the opposite end of the link 213 being pivoted, as by a pin 215, to a bracket 216, which is shown as bolted on the cross bar 217 of the legs 32.

The arrangements for actuating this embodiment of my invention and for controlling the actuation thereof are shown clearly in Fig. 1, the mentioned actuating mechanism may optionally comprise an invention which is presented in my application for Letters Patent entitled Clutch mechanism, Serial No. 719,500, filed June 12, 1925, of which no detailed description need be given here, similar mechanisms being well known. My control mechanism may comprise a pair of trip rods 220, which may extend vertically through brackets 221 and may have handles 222 on the top ends thereof. The lower ends of the trip rods 220 are shown as linked to the opposite ends of a balance arm 224, Fig. 1, which is pivotally mounted on a block 225 formed on the shaft 226, extending through bearings 227 of the front legs 31 and having a lever 229 secured to the right hand end thereof. A rod 230 is shown as pivoted to the lever 229 at 231, and as extending rearwardly to a follower 233, to which it is secured. The follower 233 may ride on a cam 234, which is shown as a part of a clutch 236 situated on the extending end of the crank shaft 200. The follower 233 is arranged to engage a pin 238 secured to a pawl 239, which pawl may be pivoted to the leg frame 32 at 240 and arranged to engage an arm or lever 241 extending from a clutch housing 242. A drive wheel 243 is shown as secured on the crank shaft 200, and this drive wheel may be rotated by means such as a belt (not shown).

The actuating mechanism is preferably so arranged as to make it necessary for an operator to employ both hands to operate it, this construction avoiding possibility of an accident due to the presence of the operator's hands in the mechanism while it is in operation. From Figs. 1 and 3 it will be seen that upon a depressing of only one of a pair of handles 222, the balance may merely swing on its pivot; but when both the handles are simultaneously depressed, the balance bar 224 must move downwardly and the shaft 226 must rotate, pulling the rod 230 forwardly and resulting in a removing of the pawl from engagement with a lever 241. This lever 241 is preferably associated with an engaging element, not shown, and when disengaged by the pawl it may swing in such a manner as to cause engagement between the clutch 236, which is rigid on the shaft 200, and the pulley 243; this engagement resulting in a rotation of the crank shaft. When the crank shaft completes its revolution, the mentioned pawl may again engage the lever 241 and disengage the drive or pulley wheel 242. In order that the crank shaft shall stop immediately when the pulley is disengaged, retarding means such as a brake 244 may be provided at the opposite end of the crank shaft 200, this brake being shown as comprising a cylindrical member 245 secured to the crank shaft and a pair of adjustable shoes 246, held by a rod 248. The pressure of the shoes on the member 245 may be adjusted, as by turning a nut 249, which is shown as threaded on a bolt 250 passing through the shoes, means such as a spring 252 being provided to effect a suitable contact therebetween.

The normal or inoperative position of parts being shown in Figs. 1, 2 and 3, it will be understood that, whenever my machine is actuated as previously described, the parts may move to substantially the relative positions in which they are shown in Fig. 4, and then return to starting position again, the operation of the more important parts mentioned above being substantially as follows.

The turning of the crank 204, or its equivalent, moves the connecting rod 202 rearwardly, and this movement is effected in the organization described, to swing the upper end of the rocker arm 207 rearwardly; and this results in the rearward movement of the complete carriage. A fruit being held in position by the operator, the pitting bar 108 and the pitting center 116 move rearwardly until the pitting center engages the pit of the fruit, somewhat as indicated by the dotted lines 255, of Fig. 4, or until the lug 130 engages the stop 256, Fig. 2. This stop may be in the form of a collar threaded on the end of a rod 257. The rod 257 may extend through a hole in the lug 130, and it may be secured to a bracket 259, shown as retained by the screw 260 at the forward end of the bed 30. The pitting center head 101, however, moves rearwardly into substantially the position shown in Fig. 4, the forward ends of the lower arms 48 of the incisor frames 43 and 44 and the severer separator 70 passing between the legs 102 thereof. During this movement, the rollers 175 and 180 of the upper and lower tucker bars 154 and 165 follow the course predetermined by the tracks 176 and 181, and reach the position shown in Fig. 4, the tucker arms rotating on their pivot pins 162 and 172 respectively. The portions 262 of the wires 185 pass rearwardly between the blades 55 and assume the position shown in Fig. 4. The second half of revolution of the crank 204 moves the carriage 90 back to starting position. The rollers 175 and 180 follow the tracks 176 and 181 and return the tucker arms 154 and 165 to their initial position. The portions 262 of the wires 185 pass forwardly between the incisor blades 55 and are engaged by the separating wedge 74, and ride outwardly along the sides 76, being forced to opposite sides of the pitting center 116. When the portions 262 reach the positions indicated by the dotted lines 263 (see Fig. 6) they engage the fingers 81 of the adjusters 80, which may be in the position indicated at 85. As the wires are moved forwardly, the fingers ride upwardly; and if the pit-engagers have slipped down on the wires 185, they will be returned to their proper positions. The pitting center head 101 and the pitting center bar 108 may move forwardly together until the forward end of the bar 108 strikes the bracket 259. The pitting center head will then move to its initial position, the bar 108 sliding in the bore 105, by reason of its engagement with the bracket 259.

It will readily be seen that if the same portions of wire 262 were continuously used, wear and crystallization might soon occur, causing the wires to break. My invention accordingly provides a means for gradually changing or renewing the active portions 262 of the wires 185. An arrangement for accomplishing this feeding of the wire is shown clearly in Figs. 1, 2, 4 and 13. Referring especially to Figs. 1 and 2, toothed wheels 266 are shown as rigidly secured to the take-up reels 150 and concentric therewith. Adjacent to the toothed or ratchet wheel 266, arms 267 are pivotally placed on the shaft 152, being shown as retained thereon by cotters 269. The arms 267 may extend downwardly, as shown in Fig. 1, and they may be provided with spring pawls 270, engaging the ratchet wheels 266, secondary or holding pawls 272 being shown as secured to blocks 274 mounted on the bars 91. When the carriage moves to its rearward position, the lower ends of the arms 267 engage the stops 276, and they are thereby swung from their substantially vertical position into such a position as is shown at 277, in Fig. 4. The stops 276 may be in the form of bolts or pins, shown as threaded into arms 278 of the brackets 97. By turning the pins 276, any desired throw of the arms 267 may be obtained; and when the arms 267 are swung in this manner the mentioned pawls ride over the teeth of the ratchet wheel 266. Upon the returning of the carriage 90 to its initial position, the arms 267 will engage the stationary stops 280 and again be swung into a substantially vertical position. The pawls 270 will at this time engage one of the teeth of the ratchet wheels 266, and thereby rotate the take-up reels a distance proportionate to the swing of the arms 267, which may be regulated by adjusting the positions of the adjustable stops 276. The reels 150 may be in this manner turned in the direction of the arrow 282, winding up the flexible severing members 185 and causing the magazines 147 to rotate as indicated by the arrow 283 of Fig 1. By arranging the feeding or advancing of the wires to occur when the carriage is approaching the end of its travel, the wires are fed when they are otherwise inactive.

An advantageous means or mechanism whereby the tension of the severing wires 185 may be automatically regulated is shown most clearly in Figs. 2 and 6. As shown, this arrangement comprises a pair of pivoted stop members 286, which pivot on pins 287, these pins being secured in a flange 288, which is shown as formed on the rear face of the incisor head 38. The stop members or levers 286 may rest in a substantially horizontal plane, and the forward ends 290 thereof may extend through the openings 291 in the head 38 and curve downwardly as shown. Wire-engaging means in the form of rods 294 may be secured at the extreme ends of the levers 286, extending inwardly as shown in Fig. 2. An upper wire separator 297 is shown as secured to the front face of the incisor head slightly below and between the openings 291, (see Fig. 3), cap screws 299 being provided for the purpose of securing the wire separator in place. This separator may comprise a tail 300 extending rearwardly and downwardly below the wire 185, and it may comprise also a lug 301 in which is shown an oblong slot or opening 302, in which slot, the inner ends of the rods 294 are shown as meeting. Slightly to the rear of the pivots 287, a spring 305 may engage the lower faces of the levers 286, to exercise an upward resilient force thereon. The force applied on the levers 286 may be adjusted by turning a screw 306, which is shown as threaded through a nut 307 secured to the lower end of a tube 308, said tube being in turn secured in a flange 309. The screws 306 have traveling nuts 311 placed thereon suitably to support the springs 305, the construction here referred to being such that by moving the nuts 311 in either direction, it is possible to increase or decrease the spring pressure.

Rotatably placed on the shaft 144 between the frame 140 and the magazine reels 147, ratchet arms 313 are shown as pivoted; and secured to the upper ends of the arms 313, I may provide pins 314, on which pawls 316 are secured, these pawls 316 being arranged to engage teeth 317 of the inner plates 318 of the reels 147. Arms 313 may be retained in the position of the full lines in Fig. 6 by means such as the tension springs 320, which are attached to and extend between the arms 313 and ears 321. The springs 320 may press the arms 313 against the ends of stop pins 322, shown as threaded through the ears 321. So long as the tension on the wires 185, which, when the machine is in inoperative position, extend below and engage the rods 294 exerting an upward pressure thereon, remains suitable, the levers 286 will rest in substantially the position indicated by the full lines of Fig. 6.

When, however, the tension on the wires 185 exceeds a certain limit, which is determined by the adjustment of the springs 305, the levers 286 will be swung into the position indicated by the dotted lines 324 of Fig. 6. It will be seen that the mentioned levers may if the tension upon the wires is sufficient, be swung into the dotted line position 324, just before the carriage 90 reaches the end of its return travel; and whenever this occurs, the rearward ends 325 of the levers 286 will engage the squared ends 327 of the pins 314, causing the arms 313 to rotate into substantially the position indicated by the dotted lines 328, and the pawls 316 will rotate the reels 147 in such manner as to "feed" the wires 185 and reduce the tension thereon. As soon as the tension on the wires is reduced, the levers 286 may again assume substantially the full line position indicated in Fig. 6, the arms then assuming their original positions. It will be seen that by regulating the positions of the pins 322, the throw of the arms 313 and the relief of the wires 185 may be varied.

As above mentioned in the preamble of the specification, it is usually desirable to remove the "tips" from certain fruits in preparation for canning. Mechanism for accomplishing the tipping, as this operation is called, is shown best in Figs. 2, 9, 10 and 11, wherein are shown primary and secondary tipper levers 331 and 332, adapted to impart movement to blades extending substantially at right angles to the described incisor blades, the primary lever 331 being secured at its lower end to a horizontal tipper shaft 333, which may be supported by bearings 335 and 336, and the secondary lever 332 being shown as pivoted at 337 to a bracket 338. At the rearward end of the tipper shaft and adjacent to the bearing 336, a tipper cam follower 339 is shown as secured, this follower having a roller 341 attached to the lower end thereof and arranged to ride in a channel 342 of a tipper cam 343, which is shown as secured on the crank shaft 200.

A clevis 345 is shown as pivoted to a primary tipper lever at 346, and a clevis 347 may be pivoted to the secondary tipper arm at the lower end 348. A transmitting rod 349 is secured to the clevises 345 and 347 being shown as offset at 350, so as to extend below the carriage 90. Knife holders 353 are shown as yieldingly associated with the upper ends of the primary and secondary tipper levers 331 and 332 by means of pins 354, which may extend into horizontal slots 355 formed in holders 353. Lugs 356 may be formed on the upper ends of the levers 331 and 332, and angles 358 may be secured to the knife holders 353, coil springs 359 being shown as placed between the lugs 356 and the angles 358 in such manner as yieldingly to hold the pins 354 in the outer portions of the slots 355. Knives 361 are shown as fastened to the inner parts of the holders 353, the inner ends 362 thereof being sharpened as shown. Guides 363 may be provided for the knives 361, these knife guides being shown as secured to the bed 30 by brackets 364 and as having the inner ends thereof cut away at 365, so that the tips of fruits may pass thereinto. Blocks 367 may be situated at the inner portions of the holders 353, which as shown in Fig. 11, are engaged by the lower ends 368 of the holder-supporting members 369, shown as secured to the head 38 by rivets 370, the said members being adapted to support the holders 353 by means of lips 371, which may engage the lower faces of blocks 367 and may also hold the knives resiliently against the knife guides 363. The described tipping mechanism is shown as arranged to be actuated just after the pitting center 116 has engaged a pit 255 (see Fig. 4) and just before the severing members 262 enter the fruit to be halved and pitted, the action of this mechanism being substantially as follows.

An offset in the cam channel 342 swings the follower into substantially the position of the dotted lines 373, rotating the shaft 333 and swinging the primary arm inwardly, as shown by the lines 373 of Fig. 9. This motion moves the transmitter rod, which swings the lower end of the secondary lever 332 outwardly and the upper end thereof inwardly, as shown by the lines 374. The levers 331 and 332 are intended to be so proportioned and synchronized that the upper ends move inwardly an equal distance, and such that the inward movement of the upper ends of the levers 331 and 332 shall move the knives 361 inwardly into substantially the positions indicated by the dotted lines 376 of Fig. 10, the edges 362 engaging the incisor blades 55 as shown. In the event that an impediment, such as a part of a broken pit, should lodge between the edge 362 of one of the knives 361 and one of the blades 55, so that the knife cannot travel the normal distance, the yielding connection between the lever and the holder is intended to allow the pin 354 to move in its slot 355, so that no damage to parts need result.

Because of the fact that a fruit does not always fall from the incisor blades after it has been severed, it is desirable to provide means for mechanically removing halves from the blades, and an advantageous meat-removing mechanism is accordingly shown in Figs. 2, 3 and 12. As shown in these figures, a pair of bearing brackets 380 rotatably support a shaft 381, and arms 382 are rigidly secured on the shaft 381, from which they extend upwardly as shown in Fig. 12. Horizontally extending bars 384 are secured to the levers or arms 381, as by fixtures 385, a pin 386 being shown as extending through said arms and said fixtures. The forward ends of the bars 384 may extend through holes 387 in the incisor head; through slots 388 in the knife holders 353, and through holes 391 in the knife guides 363, as shown in Fig. 10; and on the extreme forward ends of the bars 384, meat removing plates 393 may be secured, as by suitable nuts 394. The inner portions of the plates 393 are provided with fingers 395, which may be positioned above and below the knives 361 and the guides 363 (Fig. 3) and may be bent backwardly, as indicated at 397, so that the ends 398 extend to the rear of the tipper knives 361. The meat removers may be arranged to be actuated by a cam and follower arrangement such as is shown clearly in Fig. 12, a cam 400 being rigidly placed on the crank shaft 200 near the left-hand bearing thereof. A cam follower 401 is shown as being an integral arm extending from the left-hand arm or lever 382. When the carriage has reached the end of its rearward travel and a fruit has been severed, the cam 400 may occupy a position as shown by the full lines in Fig. 12. As the carriage 90 moves forwardly, the cam 400 must move to the position of the dotted lines 402, shifting the follower 401 into the position of the dotted lines 403. This motion of the follower 401 rotates the shaft 381 and swings the levers 382 as shown by the dotted lines 405. The bars 384 are thereby moved forwardly and the plates 393 move forwardly into the position of the dotted lines 406 in such a manner that the fingers 395 will, if any fruit has remained on the incisor, remove the same therefrom. The fruit, which is now in halves, may then fall through the channel 408 (shown diagrammatically in Fig. 12 only) into a suitable receptacle 409. When the carriage has reached its initial position, the cam 400 allows the meat-removing mechanism to be returned to its normal position by means such as a coil spring 410, which is placed on one of the bars 384, between the head 30 and a washer and pin 411 and 412. A dividing plate 415, as shown in Figs. 2 and 12, is situated on the left-hand side of the machine, and it is bifurcated at 416 so that it may be swingably supported by the bar 417, the upper edge of the plate 415 extending in the channel 418 provided at the lower edge of the left-hand removing plate 393. When the plates 393 move forwardly, the dividing plate 415 assumes the position of the dotted lines 420, Fig. 12, in a manner to make the pit-conducting channel 421 accessible, which channel leads to a pit compartment 422 in the box 409, as shown only in Fig. 12.

After the halves of the fruit have been removed from the incisor, the next operation or step may be the ejection of the pit; and my preferred pit-ejecting mechanism is shown best in Figs. 1, 2, 9 and 13. This mechanism comprises a cam follower 430, which pivots on the shaft 381, being shown as situated near the right-hand side of the machine. An arm 431 extends forwardly from the follower 430 and is associated with a lever 433, as by a link 434, this lever being shown as secured on the end of a shaft 435, which extends through a sleeve 436 secured through the incisor head 38, and has a pit ejector 438 secured to the forward end thereof, as by a suitable nut 439. The cam follower 430 is shown as provided with fingers 440 and 441, which are arranged to engage the cam surfaces 443 and 444 respectively, of a pit-ejector cam 445, which is shown as secured on the crank shaft 200. The ejecting mechanism may normally rest in substantially the position as shown in Figs. 1 and 9, and the action of this mechanism may be as follows:

As the meat removers 393 reach the end of their forward travel and after the halves of the fruit are removed from the incisor, the ejector 438 will very quickly swing into the position indicated by the dotted lines 465, Fig. 9, thereby ejecting the pit from between the central blade 52 of the incisor and the pitting center 116. I may provide a housing (as indicated by the dotted line 447) against which the pit will strike, thereafter falling through a channel 421 (see Fig. 12) and into a compartment 422, the dividing plate 415 being swung, as by the meat-removing plate 393, to render the channel 421 accessible. The indicated action of the ejector results from the engagement of the finger 440 of the follower 430 by the peak or proud portion 448 of the cam surface 443, which is intended to move the follower from the position shown in Fig. 1 into the position shown in Fig. 13, the arm 431 being swung downwardly and the lever 433 being also swung downwardly, through means such as a link 434, into substantially the positions shown in the last mentioned figures, this movement being effective to rotate the shaft 435 and to cause the ejector to assume the position referred to or the position shown at 465 of Fig. 9. The ejector 438 may be quickly returned to its normal position, before the returning of the plates 393, as by engagement between the fingers 441 of the cam follower 430 and the curved portion 450 of the cam surface 444.

The complete operation of the above described pitting machine, when utilized for halving and pitting a fruit such as a peach, is as follows:

The operator may be seated in front of the machine. The operator places a peach 460 so that the pit finder 122 extends into the stem recess 461 of the peach and preferably so that the "seam" of the peach is turned in an upward direction. The positioning of the seam, as is clearly set forth in my previous application mentioned, determines the orientation of the pit 462 of a peach 460. Referring to Fig. 15, the peach is moved into the position as indicated by the dotted lines 464; this movement disengages the latch 129, as above described and allows the finder 122 to move rearwardly into the position shown in Fig. 16. The peach 460 is now supported between the pit finder 122 and the forward edges 62 of the incisor blades 55. The operator may now remove his hands and start the machine which can preferably be accomplished only by depressing both handles 222, as described. The carriage 90 moves rearwardly and the pitting center 116 moves rearwardly, engaging a peach substantially as shown by the dotted lines 465 of Fig. 16, and forcing the peach 460 rearwardly onto the incisor blades 55, as shown in Fig. 17. The peach is now held securely in place by the engagement of the pit 462 with the central blade 52, this blade being forced thereagainst by the pitting center 116. This completes the rearward travel of the pitting bar and center, the pitting center head passing along the bar 108, owing to the frictional engagement therebetween, and as clearly shown in Fig. 5. The severing portions 262 have by this time moved into the position shown in Fig. 17, and as the carriage continues to move rearwardly, the portions 262 enter the fruit as shown in Fig. 18. As the wires 185 enter the fruit, the central portion of the parts 262 is retarded, somewhat as shown in the various dotted positions 465 of Fig. 18. As shown in Fig. 7, the portions 262 must follow the direction of the faces 250 of the blade frame 43 and 44, and they are thereby directed inwardly between the incisor blades 55, as in Fig. 20. Because of the fact that the inner edges 63 of the blades 55 extend into the meat of the peach to points adjacent to the upper and lower sides of the pit, the central portions 466 on which the pit-engagers 197 are located are caused to very closely adhere to the contour of the pit 461. The pit engager 197, being rotatably disposed on the wires 185, will roll over any sharp projection on the pit. The tipper knives 361 are arranged to operate when the carriage has moved rearwardly, so that the rollers 175 and 180 are ready to ride on the converging portions 177 and 182 of the tracks 176 and 181. As shown in Fig. 19, the tip 468 of the peach 460 extends through the openings 365 of the guides 363. The knives 361 are moved inwardly, as described above, cutting the tip 468 from the peach, and returning to normal position before the portions 262 of the severing wire completely sever the fruit. At the end of their rearward travel, as in Fig. 4, the pit engagers 197 are against the blade spacers 53, the wires 185 are in the position shown, and the peach has been completely severed. As the carriage 90 moves forwardly, the meat removing mechanism operates as previously described, moving the plates 393 into the positions shown by the dotted lines 406 of Fig. 12, and 468 of Fig. 19; this removes the halves of the fruit from the incisors, the halves falling through the channels 408 into the box 409. While the meat removing plates 393 are still in forward position, the pit-ejector is actuated as previously described, swinging into the position indicated by the dotted lines 466 of Fig. 9 in a manner to expel the pit from between the central blade 52 and the pitting center 116. The pit ejector and the meat removers then return to normal positions. During the rearward travel of the carriage, the pitting center head 101 has moved rearwardly along the pitting center bar 108, as shown in Fig. 4. During the forward travel of the carriage, the head 101 and the bar 108 travel together until the forward end 469 of the bar 108 engages with the bracket 259. When the bar 108 stops, the pitting center head 101 rides forwardly on the bar until the original position of the parts is attained, the forward travel of the carriage 90 being completed.

The pit finder 122 is automatically locked in retracted position as follows: As the pitting center 116 and the bar move from the position shown in Fig. 16 into the position shown in Fig. 17, the finder 122, which has previously been projected rearwardly, is again forced into the bar 108. Then, as the pitting center head 101 moves along the bar 108, the bottom 470 of the slot 131 engages the inclined face 472, moves the latch to the full line position of Fig. 5, and then rides along the face 473, retaining the latch in its upper position. As the carriage returns, the spring 134 forces the notch 127 into engagement with the finger 133 of the latch, again locking the pit-finder in retracted position. In the event that any halves of fruit should fall on plates 474 secured to the bottom 36 of the forward part of the bed 30, they will be forced therefrom by the wings 475 of the pitting center head 101, when the carriage moves rearwardly.

In Fig. 22, a half 476 of a peach prepared by my machine is shown. The severing members may produce a very smooth, clean-cut surface 477 and practically no meat is lost through adherence to the pit.

In the event that the pit 462 is not supported so that it rests centrally in regards to the incisor; that is, so that the point 480 extends to one side and to the rear of the central blade 52 as shown in Fig. 21, it will still be possible to completely pass the severers around the pit. In Fig. 21, it will be seen that the normal termination of the severing wires 185 is against the spacers 53. It will further be seen that even though the pit 462 extends to the rear of the engaging face of the central plate, it still remains to the forward of the termination of the severers 185; and even though one of the wires is deflected laterally a greater distance, it will still terminate against the spacers 53, completely passing the pit. With this construction, eccentrically supported pits and "freak" pits will not impede the operation of the machine.

Although, I have referred to my machine as being of particular utility in the fruit canning industry, and have described a machine designed for the pitting of peaches, it should be understood that my machine is of great value in other industries also, such as the fruit drying industry, for example, and that machines of the general type described may advantageously be employed for pitting other drupaceous fruits. Various parts might be independently employed and various modifications might be devised by those skilled in the art, without departing from the spirit and scope of my invention, as the same is indicated above and in the following claims.

I claim as my invention:

1. In a pitting machine, the combination of: an incisor comprising a central blade, adapted to engage the pit of a fruit, and lateral incisor blades; means for impaling a fruit on said incisor; and flexible severers mounted to permit relative movement between said severers and said fruit.

2. In a pitting machine, the combination of: an incisor comprising a central blade spaced from but rigidly secured to lateral incisor blades; means for impaling a fruit on said incisor; flexible severing members; and means for moving said flexible severing members relatively to said fruit.

3. In a pitting machine, the combination of: a stationary incisor comprising lateral blades spaced from a central blade upon which a fruit may be impaled; flexible severing members; and means for drawing said severing members through said fruit.

4. In a pitting machine, the combination of: a stationary incisor comprising a central blade spaced from but rigidly secured to lateral incisor blades; means for impaling a fruit upon said incisor; flexible severing members; and means for drawing said severing members through said fruit.

5. In a pitting machine, the combination of: an incisor; means for impaling a fruit on said incisor; flexible severing members; means for drawing said severing members through said fruit; and meat removers arranged to remove the halves of said fruit, from said incisor subsequent to the severing thereof.

6. In a pitting machine, the combination of: an incisor; means for impaling a fruit on said incisor; flexible severing members; means for drawing said severing members through said fruit; and meat removers arranged to remove the halves of said fruit, from said incisor subsequent to the severing thereof, and a pit ejector arranged to eject the pit of said fruit from the machine subsequently to the removing of said halves of said fruit.

7. In a pitting machine, the combination of: an incisor; means for impaling a fruit on said incisor; flexible severing members; means for drawing said severing members through said fruit; and meat removers arranged to remove the halves of said fruit, from said incisor subsequent to the severing thereof; and a pit ejector arranged to eject the pit of said fruit from the machine subsequently to the removing of said halves of said fruit, and means for separating said halves of said fruit and said pit.

8. In a pitting machine, the combination of: an incisor; means for impaling a fruit on said incisor; and flexible severers mounted to permit relative movement between said severers and said fruit; and tipping means for removing the tip from said fruit, said tipping means comprising oppositely disposed and horizontally guided knives movable by tipper levers separately pivoted.

9. In a pitting machine, the combination of: an incisor; means for impaling a fruit on said incisor; flexible severing members; means for moving said flexible severing members relatively to said fruit and tipping means for removing the tip from said fruit, said tipping means comprising cam-operated blades yieldably supported.

10. In a pitting machine, the combination of: a stationary incisor upon which a fruit may be impaled; flexible severing members; and means for drawing said severing members through said fruit; and tipping means for removing the tip from said fruit, said tipping means comprising blades which extend substantially at right angles to blades of said incisor and shiftable in a horizontal plane by means comprising levers pivoted in substantially vertical planes.

11. In a pitting machine, the combination of: a stationary incisor comprising a central blade spaced from but rigidly secured to lateral incisor blades; means for impaling a fruit upon said incisor; flexible severing members; means for drawing said severing members through said fruit; and tipping means for removing the tip from said fruit, said tipping means comprising blades which extend substantially at right angles to blades of said incisor.

12. In a pitting machine, the combination of: an incisor; means for impaling a fruit on said incisor; flexible severing members; means for drawing said severing members through said fruit; and meat removers arranged to remove the halves of said fruit, from said incisor subsequent to the severing thereof; a pit ejector arranged to eject the pit of said fruit from the machine subsequently to the removing of said halves of said fruit; and tipping means for removing the tip from said fruit.

13. In a pitting machine, the combination of: a forwardly recessed incisor; means for forcing a fruit on said incisor; flexible severing members extending over sheaves which are reciprocable relatively to said incisor; means for drawing said severing members through said fruit; and mechanism for so advancing said severing members as to renew the severing portions thereof.

14. In a pitting machine, the combination of: an incisor; means for forcing a fruit on said incisor; flexible severing members; means for drawing said severing members through said fruit; and mechanism for so advancing said severing members as to renew the severing portions thereof; and mechanism arranged to regulate the tension of said severing members.

15. In a pitting machine, the combination of: an incisor; means for forcing a fruit on said incisor; flexible severing members; means for drawing said severing members through said fruit; and mechanism for so advancing said severing members as to renew the severing portions thereof; and means for reducing the tension on said severing members when the tension thereof exceeds a certain limit.

16. In a pitting machine, the combination of: an incisor; means for impaling a fruit on said incisor; means for removing the tip from said fruit; flexible severing members; means for passing said severing members through said fruit in a manner to separate the meat thereof from the pit; means for removing the meat from said incisor; means for ejecting the pit; means for directing said meat and said pit through different channels; means for renewing the active portions of said severing members; and means for regulating the tension of said severing members.

17. In a pitting machine, the combination of: means for supporting a fruit; flexible severing members; means for passing said severing members through said fruit; and pit engagers disposed on said severing members and arranged to engage the pit of said fruit when said severing members are passed through said fruit.

18. A machine as defined in claim 17 in which said pit engagers comprise flexible members which are rotatably disposed on said severing members.

19. In a pitting machine, the combination of: a supporting structure; an incisor mounted on said supporting structure; a carriage movably mounted on said supporting structure; a pitting center, said pitting center being arranged to impale a fruit on said incisor; and flexible severing members extending over sheaves which are reciprocable relatively to said incisor for separating the meat from the pit of said fruit.

20. In a pitting machine, the combination of: a supporting structure; an incisor mounted on said supporting structure; a carriage movably mounted on said supporting structure; a pitting center, said pitting center being arranged to impale a fruit on said incisor; tucker arms carrying sheaves and supported by said structure; and flexible severing members extending over sheaves on said tucker arms and arranged for severing said fruit.

21. In a pitting machine, the combination of: a supporting structure; an incisor mounted on said supporting structure; a carriage movably mounted on said supporting structure; a pitting center, said pitting center being arranged to impale a fruit on said incisor; tucker arms supported by said carriage; magazine reels supported by said carriage; take-up reels supported by said carriage; flexible severing members extending from said magazine reels to said take-up reels and over the ends of said tucker arms, said severing members being arranged to sever said fruit when said carriage is reciprocated; and mechanism for reciprocating said carriage.

22. In a pitting machine, the combination of: a supporting structure; an incisor head mounted on said supporting structure; an incisor secured to said incisor head; a carriage supported by said supporting structure; a pitting center arranged to impale a fruit on said incisor; tucker arms mounted on said carriage; and flexible severing members extending over the ends of said tucker arms and arranged to sever said fruit by being passed therethrough.

23. In a pitting machine, the combination of: a supporting structure; an incisor head mounted on said supporting structure; an incisor secured to said incisor head; a carriage supported by said supporting structure; a pitting center arranged to impale a fruit on said incisor; tucker arms mounted on said carriage; tracks upon which said tucker arms are arranged to travel; means whereby said carriage is reciprocated; and flexible severing members extending over the ends of said trucker arms and arranged to sever said fruit when said carriage is reciprocated.

24. In a pitting machine, the combination of: a body; an incisor head mounted on said body; incisor frames secured to said incisor head; an incisor secured to said incisor frames; tracks formed on one of said frames; a carriage reciprocally supported by said body; means for reciprocating said carriage; a pitting center supported by said carriage and arranged to force a fruit on said incisor; a pit finder retained by said pitting center, said pit finder arranged to support said fruit against said incisor previous to its being forced on said incisor by said pitting center; tucker arms supported by said carriage; sheaves rotatably associated with said tucker arms; rollers secured to said tucker arms and arranged to ride on said tracks; magazine reels carried by said carriage; take-up reels carried by said carriage; flexible severing members extending from said magazine reels around said sheaves to said take-up reels, said severing members being passed through said fruit when said carriage is reciprocated.

25. In a pitting machine, the combination of: a body; an incisor head mounted on said body; incisor frames secured to said incisor head; an incisor secured to said frames; a carriage reciprocally mounted on said body; mechanism for reciprocating said carriage; a pitting center head secured at the forward end of said carriage; a pitting center supported by said head; a pit finder carried by said pitting center; a foot frame secured at the rearward end of said carriage; magazine reels supported by said foot frame; take-up reels supported by said foot frame; tucker arms pivoted to said foot frame, said tucker arms extending forwardly from said foot frame; sheaves associated with said tucker arms; rollers rotatably secured to the forward end of said tucker arms; tracks formed on one of said incisor frames on which said rollers are arranged to travel when said carriage is reciprocated; and flexible severing members extending from said magazine reels over said sheaves to said take-up reels.

26. In a pitting machine, the combination of: a supporting structure; an incisor mounted on said supporting structure comprising a pair of incisor blades; a carriage carried by said structure; means mounted on said carriage for forcing a fruit on said incisor; flexible severing members associated with said carriage; and means for guiding said severing members through said fruit and between said incisor blades.

27. In a pitting machine, the combination of: a supporting structure; an incisor mounted on said supporting structure comprising a pair of incisor blades; a carriage carried by said structure; means mounted on said carriage for forcing a fruit on said incisor; flexible severing members associated with said carriage; and means for guiding said severing members through said fruit and between said incisor blades; movable pit engagers placed on said severing members; and means for returning said engagers to initial positions on said severing members.

28. A device as defined in claim 27 in which said pit engager returning means includes fingers, which ride upwardly along said severing members in such a manner as to contact said pit engagers when said severing members return to starting position.

29. In a pitting machine, the combination of: a supporting structure; a pair of incisor frames; means for securing said frames to said structure; an incisor mounted on said frames comprising a pair of incisor blades and a central blade; a carriage reciprocally supported by said structure; means carried by said carriage for forcing a fruit on said incisor; flexible severing members associated with said carriage; and means for drawing said severing members through said fruit and between said incisor blades.

30. A device as defined in claim 29 in combination with a means for spreading said severing members to the opposite sides of said forcing means, said spreading means comprising a wedge-shaped member against which said severing members contact as they return to starting position.

31. In combination, in a pitting machine, an incisor; and means, comprising transversely movable knives oppositely reciprocated for removing the tips of fruits.

32. In combination, in a pitting machine comprising an incisor: movable tipping knives; and means for moving said knives so as to remove the tip from a fruit retained on the incisor of said machine.

33. In combination, in a pitting machine: a pair of levers, knives associated with said levers; and means associated with said levers for moving said knives in such manner as to remove the tip from a fruit retained on the incisor of said machine.

34. In combination, in a pitting machine: a pair of levers pivoted to the supporting structure of said machine; knife holders pivoted to said levers; knives secured to said holders; and means associated with said levers for moving said knives.

35. In combination, in a pitting machine: a pair of levers pivoted to the supporting structure of said machine; knife holders pivoted to said levers; knives secured to said holders; guides for said knives; and means associated with said levers for moving said knives.

36. In combination, in a pitting machine: a pair of levers pivoted to the supporting structure of said machine; knife holders pivoted to said levers; knives secured to said holders; guides for said knives; means for holding said knives against said guides; and means associated with said levers for moving said knives.

37. An arrangement as defined in claim 36, in which said means for moving said knives comprises: a cam and follower, one of which is situated on a crank shaft of said machine; and means for interconnecting said follower with one of said levers.

38. In combination, in a pitting machine comprising an incisor: a pair of meat removing plates; rods arranged to support said plates, said rods being slidably mounted on said machine; and means for so actuating said rods as to cause said plates to remove the meat of a fruit from said incisor.

39. In combination, in a pitting machine comprising an incisor: a shaft rotatably arranged on said machine; arms extending from said shaft; rods secured to said arms; meat-removing plates arranged on said rods and adjacent to the incisor of said machine; and means for rotating said shaft.

40. A device as defined in claim 39, in which said means for rotating said shaft comprises a cam and follower arrangement associated with the crank shaft of said machine.

41. In a pitting machine of the general character defined in claim 32: a pit ejector supported by said machine; and means for so actuating said pit ejector as to eject from between the blades of the incisor of said machine the pit of a fruit previously severed.

42. In combination, in a pitting machine comprising an incisor having blades: a sleeve secured to said machine; a shaft extending through said sleeve; a pit ejector arranged on said shaft adjacent to the incisor of said machine; and mechanism associated with said shaft for so rotating the same as to swing said pit ejector, to eject the pit of a fruit from between the blades of said incisor.

43. In combination, in a pitting machine comprising an incisor: a sleeve secured within said machine; a shaft extending through said sleeve; a pit ejector secured to said shaft and adjacent to the incisor of said machine; an arm pivoted to a fixed element of said machine, a means operatively connecting said arm with said shaft, and means for swinging said arm.

44. A device as defined in claim 43, in which said means for swinging said arm comprises: a cam mounted on a crank shaft of said machine; and a follower for said cam.

45. In combination, in a pitting machine:

flexible severing members; and means for advancing the severing members of said machine, said means comprising take-up reels and mechanism, including arms pivoted on a shaft on which said reels are placed, for rotating said take-up reels of said machine in such manner as to wind the severing members thereon.

46. In combination, in a pitting machine comprising a severing member movable by a take-up reel: reel rotating members located adjacent to a take-up reel; means for actuating said reel rotating members, said actuating means comprising stops which are secured to a fixed part of the machine and against which said reel rotating members contact.

47. An arrangement as disclosed in claim 46, in which said stops are adjustable.

48. In combination in a pitting machine comprising take-up reels for a severing means: arms pivoted adjacent to the take-up reels of said machine; stop members to swing said arms; and means so operatively connecting said arms and with said take-up reels as to rotate said reels when said arms are swung.

49. An arrangement as defined in claim 48, in which said means for operatively connecting said arms with said reels comprises a ratchet wheel and a pawl.

50. In combination, in a pitting machine comprising severing members: means for regulating the tension of the severing members, said tension regulating means comprising arms movable by said severing members when the tension thereof exceeds a certain limit; and means actuated by said arms for reducing the tension on said severing members when said arms are moved.

51. In combination, in a pitting machine comprising severing members: arms arranged to be pressed by the severing members of said machine; means for opposing the pressure exerted by said severing members; and means for reducing the pressure of said severing members when said pressure exceeds the pressure of said opposing means.

52. In combination, in a pitting machine comprising severing members: lever members pivoted to a part of said machine, said lever members being engaged by the severing members on one side of said pivots; means resiliently engaging said lever members on the other side of said pivots; and means for reducing the tension on said severing members when the pressure of engagement between said severing members and said lever members overbalances the pressure of said resilient means.

53. An arrangement as presented in claim 52, in which said resilient means is adjustable.

54. An arrangement as disclosed in claim 52, in which said means for reducing the tension of said severing members is arranged to rotate the magazine reels of said machine.

55. In combination, in a pitting machine comprising a severing member extending from magazine reels: pawls; means for swingably supporting said pawls adjacent to the magazine reels of said machine; and means for so swinging said pawls as to rotate said reels when the tension of the severing members of said machine exceed a certain limit.

56. In combination, in a pitting machine comprising severing means extending from magazine reels: levers pivoted to said machine, said levers being arranged to be pressed by the severing members of said machine; means for yieldingly resisting the pressure on said levers; arms pivoted adjacent to the said magazine reels; pawls mounted on said arms and arranged to engage said reels, said pawls being engaged by said levers when the pressure of said severing members exceeds that of said yielding means.

57. In combination, in a pitting machine; an incisor comprising: a pair of incisor blades; and a central blade, said central blade being arranged to retain a pit of a fruit forward of the rearward edge of said incisor blades.

58. In combination, in a pitting machine; an incisor comprising: a pair of incisor blades having recesses therein; and a central blade, the forward edge of said central blade being arranged to the position of the anterior end of said recesses in said incisor blades.

59. An arrangement as specified in claim 58 in combination with spacers situated between said incisor blades and said central blade.

In testimony whereof, I have hereunto set my hand at Riverside, California, this 4th day of June, 1924.

GEORGE WILCOX.